Figure 1:
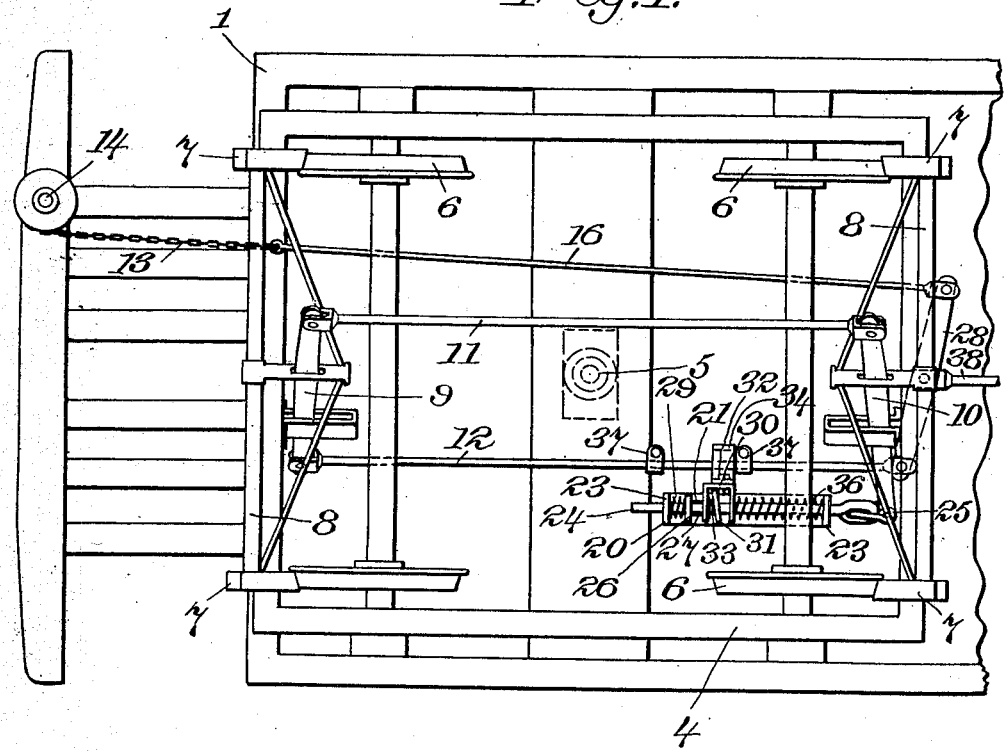

No. 860,243. PATENTED JULY 16, 1907.
A. PARKER-SMITH.
SLACK ADJUSTER.
APPLICATION FILED NOV. 30, 1906.

2 SHEETS—SHEET 1.

Witnesses

Inventor
A. Parker-Smith

No. 860,243. PATENTED JULY 16, 1907.
A. PARKER-SMITH.
SLACK ADJUSTER.
APPLICATION FILED NOV. 30, 1906.
2 SHEETS—SHEET 2.
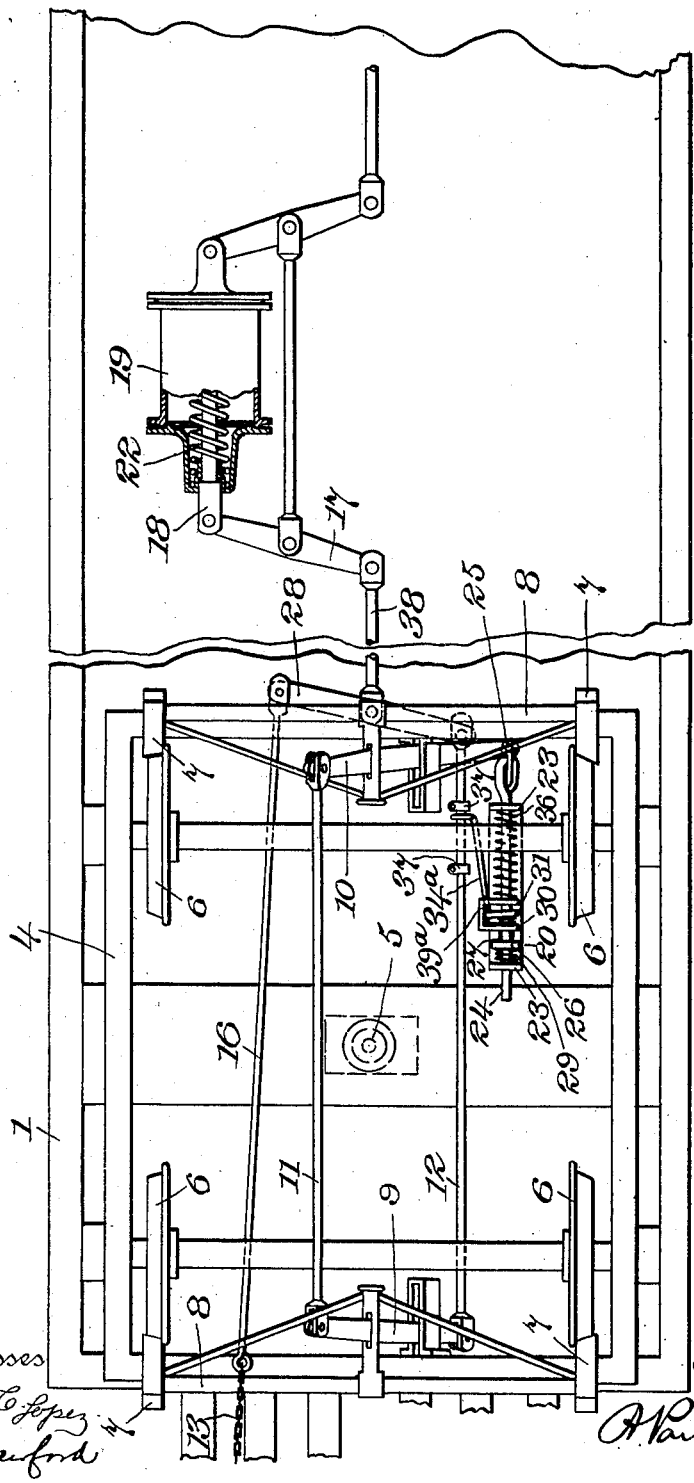
Witnesses
Inventor

UNITED STATES PATENT OFFICE.

AUGUSTUS PARKER-SMITH, OF NEW YORK, N. Y., ASSIGNOR TO ATLAS SLACK ADJUSTER COMPANY, A CORPORATION OF NEW YORK.

SLACK-ADJUSTER.

No. 860,243.    Specification of Letters Patent.    Patented July 16, 1907.

Application filed November 30, 1906. Serial No. 345,615.

*To all whom it may concern:*

Be it known that I, AUGUSTUS PARKER-SMITH, a citizen of the United States of America, and a resident of the borough of Manhattan, city, county, and State of New York, have invented certain new and useful Improvements in Slack-Adjusters, of which the following is a specification.

My invention relates to the automatic adjustment of the rigging of railway car brakes so as to take up the slack caused by the wearing down of the brake shoes and other parts, and maintain a uniform stroke of piston in the compressed air cylinder, and a uniform length of chain wound on the hand brake staff or windlass when brakes are applied. More specifically, it comprises an arrangement of apparatus designed to facilitate this result on cars where kick springs are used to hold the brake shoes clear of the wheels when brakes are released.

The best results in many ways are secured in the automatic adjustment of brakes by the use of slack adjusters provided with take-up mechanisms which are connected to the "dead" levers of the brake rigging. Such take-up mechanisms must operate to take up the slack on the release of the brakes, and not on the application of the braking pressure, unless a loss of 50% in brake efficiency can be afforded. When operating on release of brakes the motive power for the take-up device must usually be derived from a spring or a weight. In passenger cars and some other cars, more or less powerful kick springs are used to hold the brake shoes off the wheels when brakes are released. It is evident that with the ordinary arrangement of take-up mechanism these kick springs will oppose the "recover" action of the take-up spring, and that the take-up spring must be extra strong to overpower these kick springs, and still have enough resiliency left to perform its take-up action. The making of such heavy springs increases the first cost of the apparatus, and the force necessary to compress them is of course deducted from the total brake force applied, thus reducing the net braking efficiency.

I have invented an arrangement of slack adjuster parts which eliminates all hurtful effects of kick springs by causing them to neutralize one another, leaving the friction of the parts alone to be overcome by the take-up spring of the slack adjuster, or other operating means.

Figure 2:
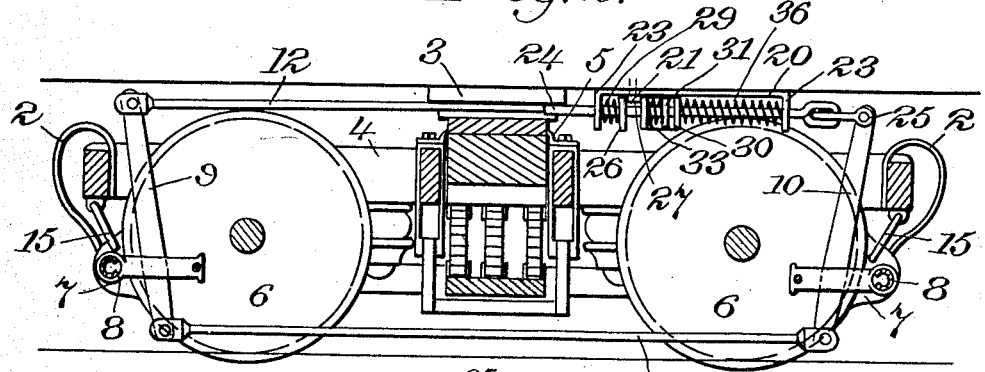
Figure 3:

The best form of apparatus embodying my invention at present known to me is illustrated in the accompanying two sheets of drawing in which:

Figure 1 is a bottom view looking upward of one end of a car with my invention applied. Fig. 2 is a vertical section through the car truck. Fig. 3 is a detail showing the take-up hook, and Fig. 4 is a view similar to Fig. 1, showing a modified take-up connection, and including the compressed air cylinder of the brake rigging, parts being broken away to show the piston spring therein.

Throughout the drawings like reference figures indicate like parts.

1 represents the car body supported on the body bolster 3, connected to truck 4 by king bolt or plate 5. The truck has the usual wheels 6, 6, to which are applied brake shoes 7, 7, carried by brake beams 8, 8, supported from the truck by links or hangers 15, 15. The brake rigging is of the standard form comprising the "live" lever 9, the "dead" lever 10, bottom rod 11, top rod 12, the hand brake lever 28, the hand brake rod 16, and the second top rod section 38, connected to the brake lever 17, which is pivoted to the piston 18, mounted in the compressed air cylinder 19 in which is the piston spring 22. The hand brake rod is connected to the chain 13, which winds up on the staff or windlass 14 in the well known way. The brake shoes are held out of contact with the wheels when the brakes are released by the kick springs 2, 2.

The slack adjuster comprises a stationary take-up device, preferably mounted upon the car body. It has, as shown, a main frame 20 pivoted to the car body by the bolt 21. The ends 23, 23, of frame 20 are bent up and perforated for the passage of the take-up rod 24, which is connected by means of the clevis 25, or other suitable device to the dead lever 10. This take-up rod 24 is held against the pull of the dead lever by means of the holding clutch dog 26, one end of which is fulcrumed on the head 27 of the bolt 21. This dog is held normally in engagement by the spring 29. 30 is a take-up frame similar in shape to main frame 20, but shorter. It is also mounted on the take-up rod 24, but preferably turned at an angle of 90 degrees to the main frame, as clearly shown in Fig. 1. This take-up frame contains a friction clutch dog 31, mounted on the take-up rod and fulcrumed on the head of bolt 32, by which the take-up hook 34 (see Fig. 3) is fastened to the take-up frame.

33 is a spring holding the take-up dog normally in engagement.

The take-up hook 34 has an opening 35 just large enough to permit the passage of the top rod 12, when the nut 39 is not in position on the bolt 32. After said bolt is placed in position, it prevents the escape of the top rod from the hook.

36 is a take-up spring which normally tends to force the take-up clutch toward the holding clutch until the take-up frame abuts against the bolt head 27.

The top rod 12 has adjustable stops 37, 37, located on either side of the take-up hook 34.

In Fig. 4 I have shown a modified connection between the top rod and the take-up frame in which the short rod 34ª takes the place of the take-up hook. This rod has at one end a bent portion 39ª, which drops into the take-up frame and serves as a fulcrum for the take-up dog. At the other end it has an eye which surrounds the top rod and plays back and forth between the two stops 37, 37.

Such being the construction of my invention, its operation is as follows: As shown in Fig. 1, the brakes are supposed to be released and the right hand stop 37 is up against the take-up hook 34. When the brakes are applied, the top rod 12 moves back and forth without affecting the slack adjuster until an application is made in which the top rod has an excessive movement sufficient to bring the left hand stop against the take-up hook 34. This of course pulls the take-up frame and clutch to the right, and compresses the take-up spring 36. When the brakes are released, the top rod moves to the left until the right hand stop strikes the take-up hook. When this happens it is evident that the left hand kick spring 2, pulling on the live lever and top rod 12, will neutralize the pull of the right hand kick spring operating on the dead lever and take-up rod 24, these two rods being locked together through take-up frame, clutch and hook. Such being the case, the take-up spring 36 is left free to move the take-up clutch and take-up rod to the left until the take-up frame brings up against the bolt head 27 again. This will adjust the brakes so that on the next application, the piston travel will be reduced to the predetermined amount and only a corresponding amount of the hand brake chain 13 will be wound up on the hand brake staff 14. When the construction shown in Fig. 4 is used, the operation will be the same.

It is evident that the action of the take-up spring 36, above described, will be assisted by the action of the piston spring 22, as it forces the piston home and in some cases this spring might be sufficiently powerful to do the work alone and permit the special take-up spring 36 to be dispensed with.

The main advantage of my invention is the elimination of the resistance of the kick springs to the take-up action. It is evident that if the right hand stop 37 (see Fig. 1) were omitted, the take-up spring 36 would not only have to overcome the friction and inertia of the rods and levers, but it would also have to overcome the resiliency of both kick springs, 2, 2. This would probably require a spring of several hundred pounds resiliency, and when the brakes were applied and excess piston travel occurred, the left hand stop 37, striking the take-up hook and meeting the resistance of this powerful spring would take this three or four hundred pounds off of the top rod pull. This might be as high as 25% of the entire top rod pull and the net brake shoe pressures would be reduced by just that percentage.

It is evident that various changes might be made in the details of construction illustrated and described without departing from the spirit and scope of my invention. Other forms of take-up apparatus might be substituted for that shown so long as the parts were so connected as to neutralize the existence of the kick springs, and the invention might be applied to other forms of brake rigging by modifications in detail without changing the principle of operation.

The opposing action of the two kick springs keeps all parts of the slack adjuster under tension when brakes are released. This prevents jarring and chattering and the consequent wearing of the parts. It also prevents any possibility of the take-up mechanism being operated by the jolting of the car to take up too much slack by a creeping action of the clutches.

Having, therefore, described my invention, I claim:

1. In an automatic slack adjusting mechanism for railway car brakes, the combination with the usual brake rigging comprising a "live" lever, a "dead" lever and a top rod, of a stationary take-up device, a connection from the dead lever to said take-up device, and an operative connection from the top rod to the take-up device, said connection being adapted to permit a predetermined amount of lost motion but capable of positive action in either direction when said predetermined amount of lost motion is exceeded.

2. In an automatic slack adjusting mechanism for railway car brakes, the combination with the usual brake rigging comprising a "live" lever, a "dead" lever and a top rod, of a take-up device mounted on the car body, a connection from the "dead" lever to said take-up device, and an operative connection from the top rod to the take-up device, said connection being adapted to permit a predetermined amount of lost motion but capable of positive action in either direction when said predetermined amount of lost motion is exceeded.

3. In an automatic slack adjusting mechanism for railway car brakes, the combination with the usual levers, rods, brake beams and kick springs, of a take-up device mounted on the car body, a connection from the dead lever to said take-up device, and two stops mounted on the top rod and alternately engaging the take-up device when a movement of the top rod in excess of a predetermined maximum occurs on application and release of brakes.

4. In an automatic slack adjusting mechanism for railway car brakes, the combination with the usual levers, rods, brake beams and kick springs, of a take-up device mounted on the car body, a connection from the dead lever to said take-up device, and two stops mounted on the top rod and alternately engaging the take-up device when a movement of the top rod in excess of a predetermined maximum occurs on application and release of brakes, said take-up device comprising a holding clutch grasping the dead lever connection, and a take-up clutch mechanism also grasping said connection and engaged by said stops on the top rod.

5. In an automatic slack adjusting mechanism for railway car brakes, the combination with the usual levers, rods, brake beams and kick springs, of a take-up device mounted on the car body, a connection from the dead lever to said take-up device, and two stops mounted on the top rod and alternately engaging the take-up device when a movement of the top rod in excess of a predetermined maximum occurs on application and release of brakes, said take-up device comprising a holding clutch grasping the dead lever connection, and a take-up clutch mechanism also grasping said connection and engaged by said stops on the top rod, together with a spring normally holding the take-up clutch mechanism at a fixed distance from the holding clutch.

6. The combination with the usual brake rigging comprising a "live" lever, a "dead" lever, brake beams, top rod and kick springs, of a stationary take-up device comprising a take-up rod connected to the "dead" lever, a holding clutch grasping said rod, a movable take-up clutch also grasping said rod, a connection from the "live" lever to the take-up clutch, and means normally tending to force the take-up clutch toward the holding clutch.

7. In an automatic slack adjusting mechanism for railway car brakes, the combination with the usual levers, rods, brake beams and kick springs, of a stationary take-up device, a connection from the "dead" lever to said take-up device, and a connection from the "live" lever to said take-up device, whereby the opposite pulls of the kick springs are transmitted to the aforesaid take-up device and there neutralize each other.

Signed at New York, N. Y. this 27 day of November 1906.

A. PARKER-SMITH.

Witnesses:
 MANUEL C. LOPEZ,
 M. G. CRAWFORD.